United States Patent [19]

Randall et al.

[11] Patent Number: 4,586,995
[45] Date of Patent: May 6, 1986

[54] POLYMER AND IRRADIATION TREATMENT METHOD

[75] Inventors: James C. Randall, Bartlesville, Okla.; Frederick J. Zoepfl, Annandale, Va.

[73] Assignee: Phillips Petroleum Company, Bartlesville, Okla.

[21] Appl. No.: 419,248

[22] Filed: Sep. 17, 1982

[51] Int. Cl.$^4$ .............................................. C08F 2/46
[52] U.S. Cl. ......................................... 522/5; 526/90; 522/161
[58] Field of Search ..................................... 204/159.2

[56] References Cited

U.S. PATENT DOCUMENTS

| 2,825,721 | 3/1958 | Hogan et al. | 526/352 |
| 2,878,174 | 3/1959 | Rainer et al. | 204/154 |
| 2,906,678 | 9/1959 | Lawton | 204/154 |
| 3,146,146 | 8/1964 | Anderson | 156/272 |
| 3,349,018 | 10/1967 | Potts | 204/159.2 |
| 3,563,870 | 2/1971 | Tung et al. | 204/159.2 |
| 4,288,584 | 9/1981 | Mishra | 526/348.4 |
| 4,316,973 | 2/1982 | Kennedy | 525/335 |

FOREIGN PATENT DOCUMENTS

| 638387 | 3/1962 | Canada | 204/159.2 |
| 0035674 | 11/1970 | Japan | 204/159.2 |

OTHER PUBLICATIONS

Bovey, The Effects of Ionizing Radiation on Natural and Synthetic High Polymers, pp. 97–114 (1958).
Wild et al., Gel Permeation Chromatography of Polyethylene, J. App. Polymer Sci., 21, 3331–3343 (1977).
Randall, Characterization of Long-Chain Branching in Polyethylenes Using C-13 NMR, ACS Symposium #142 (1980).
Mitsui, Radiation-Induced Cross-Linking of Polyethylene, Polymer Journal, 4, 79–86 (1983).

Primary Examiner—Theodore Morris
Attorney, Agent, or Firm—Edward L. Bowman

[57] ABSTRACT

A novel polymer and polymer treatment method are provided. The method involves irradiation of a polymer under non-gelling conditions at a temperature above the polymer melting temperature and in the absence of oxygen. The polymer is characterized by a unique long chain Y-branched molecular structure.

45 Claims, 5 Drawing Figures

POLYMER AND IRRADIATION TREATMENT METHOD

BACKGROUND OF THE INVENTION

This invention relates to a novel polymer. It further relates to a method for preparing a polymer. In another aspect, the invention relates to a novel method for altering polymer structure using radiation.

Polyethylene is a commercially-important synthetic thermoplastic material. Its commercial importance is enhanced by increasing the variety of forms of polyethylene having different physical properties and therefore different end-use applications. The scientific study of polyethylene has provided information on the relationship between the molecular structure of polyethylene and its physical properties. It is known that molecular weight, density and molecular weight distribution are properties of polyethylene homopolymers and copolymers which significantly affect the properties of the polymers and determine the end uses for which they are suitable. It is also known that the molecular structure of polyethylene affects the properties of the polymer, and work has therefore been directed to controlling and altering the molecular structure of polyethylene to produce new forms having improved physical properties.

Polyethylenes produced commercially via high pressure, free radical processes have densities around 0.92 g/cc and are referred to as "low density" polyethylenes. It is known that the polymer molecules produced by such processes have appreciable quantities of ethyl, butyl and amyl branches and relatively few long chain branches in comparison. Polyethylenes having densities of about 0.96 g/cc are called "high-density" polyethylenes and can be prepared using either titanium or chromium based catalysts. The molecules are usually linear, although the properties of some high density polyethylenes suggest the presence of long chain branching at a level one to two orders of magnitude below that found for low density polyethylenes prepared by a high pressure process. The use of high sensitivity NMR spectrometers in combination with careful analytical methods enables the characterization of polymer molecular structure, molecular weight ($M_w$ and $M_n$) and molecular weight distribution ($M_w/M_n$).

The ability to characterize molecular structure and to determine the relationship between molecular structure and polymer properties has led polymer scientists to attempt to devise methods for preparing polymers meeting specific structural or end-use needs.

It would be desirable to produce a polymer characterized by long chain branches but without the accompanying short chain branches produced in the high pressure ethylene polymerization process. It would be desirable to be able to control the degree of long chain branching of a polymer and thus produce polyethylene having a predetermined set of physical characteristics.

It is therefore an object of the present invention to produce a novel polymer. It is a further object to provide a method of controlling or altering the molecular structure of a polymer. It is an object of one embodiment of the invention to produce a polymer the molecules of which have a relatively large number of long chain branches compared to short chain branches.

SUMMARY OF THE INVENTION

According to the invention, an ethylene polymer is provided, the polymer characterized by a molecular structure exhibiting distinctive long-chain Y branching, as herein defined. The polymer can have as many as about 2 to about 50 or more long chain branches per 10,000 carbon atoms. The polymer can be an ethylene homopolymer or copolymer of ethylene and one or more aliphatic mono α-olefins. In one embodiment, the invention ethylene polymer comprises molecules having long chain Y-branches and essentially no short chains. In another embodiment, the invention ethylene polymer comprises long chain Y-branches and short chains of nonrandom length distributions. Certain of the invention polymers can be further characterized by a g value, as defined herein, of less than about 0.9.

Further according to the invention, a method is provided for altering polymer molecular structure. A polymer is irradiated under non-gelling conditions in the absence of oxygen at a temperature above its melting point. The elevated temperature can be maintained prior to irradiation for a time sufficient to induce thermal, non-oxidative degradation of the polymer molecules and formation of terminal vinyl groups.

The invention provides an ethylene polymer having unique physical properties, and it provides a method for controllably altering the molecular structure, and thus the physical properties, of a polymer.

DETAILED DESCRIPTION OF THE INVENTION

In the invention polymer treatment method, an ethylene polymer is heated at a temperature above its crystalline melting point for a time effective for inducing thermal degradation of the polymer molecules. The polymer is heated under non-gelling conditions in the absence of oxygen.

As used herein, "ethylene polymer" refers to normally solid polymers comprising repeating units of the structure $—CH_2—$ and includes ethylene homopolymers and copolymers of ethylene and one or more α-olefins having from three to about twenty carbon atoms. If the ethylene polymer is a copolymer, it is preferably random in monomer distribution and contains a total of up to about 20 mole percent of at least one comonomer. As used herein, the term "polymerization" encompasses copolymerization and "polymer" encompasses copolymer.

Polyethylenes of medium or high crystallinity can be used. The majority of crystalline polyethylene is manufactured in one of two processes commonly described in terms of the pressure under which the polymerization reaction is carried out.

In the so-called "high pressure" process, the polymerization of ethylene is carried out at pressures of about 30,000 atmospheres in the presence of a suitable catalyst, such as a peroxide catalyst. The ethylene homopolymers produced in such a process are characterized by relatively low density and comprise molecules having both long-chain and short-chain branching. The majority of the end groups of the molecules are saturated. The short-chain branches are, in terms of number of carbon atoms, distributed along the polymer chain in essentially random fashion.

In the low pressure process, ethylene is polymerized under reactor pressures of about 500-600 psia to produce a polymer of relatively high density having molecules which can be generally described as linear with essentially no long chain branching. Low pressure polymerization catalysts include supported chromium and titanium-based catalyst systems. Polyethylene can be produced using supported chromium catalysts to yield predominately molecules having one vinyl end group per molecule, while polymer produced with titanium catalysts is formed predominately of molecules having saturated end groups.

Preferably in the invention process to achieve a high degree of Y-branching, a polymer comprising molecules having at least one vinyl end group per molecule is irradiated under non-gelling conditions in the absence of oxygen. Additionally, the treated polymer should have a sufficiently broad molecular weight distribution to produce an appreciable concentration of vinyl end groups in the treated polymeric material, for example, at least about 10 vinyl end groups per 10,000 carbon atoms. Thus, it can be seen that ethylene polymers produced in a low pressure process using a supported chromium polymerization catalyst can be irradiated under suitable conditions to achieve the desired long chain branched molecular structure.

Ethylene polymers prepared using catalysts which inherently produce vinyl unsaturation in the end groups are thus highly suitable as starting materials for the invention process. Such polymers include Marlex® polyethylene, a linear low pressure polymerization product of Phillips Petroleum Company.

Ethylene polymer prepared in processes which inherently produce molecules having predominately saturated end groups are also suitable as starting materials for the invention process. Endgroup vinyl unsaturation must be induced in such polymers prior to or during irradiation.

It has been found that heating an ethylene polymer under non-gelling, non-oxidizing conditions prior to irradiation is an effective method of producing terminal vinyl unsaturation in polyethylene having essentially no terminal vinyl unsaturation and of increasing terminal vinyl unsaturation in polyethylene which contains unsaturated end groups. The heat treatment includes heating the polymer in a non-oxidizing atmosphere at a temperature above the melting point of the polymer. The heating preferably is carried out in vacuo, as this permits the removal of residual oxygen and low molecular weight polymer fragments from the polymeric material. The heating is preferably sustained, with the time of treatment depending upon the particular polymer composition being treated and the extent of Y-branching desired in the final product. Suitable heating times can vary widely but will generally range from about 0.5 to about 36 hours. The time of heat treatment may be longer for polymers containing stabilizers such as antioxidants conventionally added during the recovery steps of many polymerization processes. For such stabilized polymer compositions, heat treatment over a time of about 16 to 36 hours would be expected to produce the desired result of vinyl end group formation. The presence of such stabilizers is thus contemplated, and may be preferred for control of the heat treatment time. It would be expected that, for a given degree of Y-branching desired in the final product, ethylene polymers which have vinyl end groups, such as those prepared in low pressure, supported chromium-catalyzed processes, would require less heating time than ethylene polymers having saturated end groups.

The heating step is carried out under conditions which do not result in gellation of the polymer. Conditions to be avoided generally include excessive heat or excessively long heating times and the presence of oxygen during heating. A conventional test for "gellation" of polymers is insolubility in boiling xylene.

The polymer is heated to a temperature above its crystalline melting point, which will depend upon the polymer but will generally be greater than about 130° C. Heating and irradiation temperature will generally range from about 130° C. to about 300° C. Temperatures within about 200° C. to about 280° C. have been found highly suitable.

Following the heat treatment, the polymer can be irradiated under non-gelling, non-oxidizing conditions. The polymer can be exposed to ionizing radiation in the solid state or in the melt, preferably the latter prior to cooling the polymeric material from the heat treatment temperature. The irradiation can be carried out in an inert atmosphere such as nitrogen or argon or, preferably, in vacuo. The radiation dosage will vary depending upon the particular polymer being treated and the degree of Y branching desired in the end polymer. The dosage must be at least that which is effective for bringing about structural changes in the molecules of the polymer melt and not so much as to result in gellation of the polymer, an indication of crosslinking of the molecules rather than the desired exclusive formation of long chain Y branches. Suitable dosages of gamma irradiation fall generally within the range of about 0.1 to about 4 MRad, more usually about 1 MRad to to about 4 MRad; however, the proper dosage is a function of the state of the polymer treated, the properties of the polymer undergoing irradiation, and the nature of the desired end polymer, and can be determined empirically for a given ethylene starting and end polymer.

Any suitable source of high energy radiation, such as spent fuel elements from nuclear reactors, radioactive isotopes, cathode tubes and linear accelerators employing such as tungsten for the conversion of electrons to gamma rays, can be used in the invention process.

The irradiated polymer camn be cooled gradually or rapidly. Quenching from the temperature of irradiation to about room temperature has been found to be a suitable cooling method.

Irradiation which produces long chain Y-branches in the treated ethylene polymer will generally produce a broadening of the molecular weight distribution of the polymer and a reduction in density, as compared with the starting polymer. Thus, the process of the invention enables, for example, the conversion of a high-density polymer to a medium-density polymer. For ethylene polymers prepared by processes which inherently produce vinyl endgroups, formation of of the Y-branched polymer product is indicated by a decrease in vinyl unsaturation as compared with the starting material. A preferred irradiated polymeric product will be characterized by essentially no crosslinking, as indicated by complete solubility in boiling xylene.

The long chain Y-branched polymers of the invention have at least about 2, generally at least about 5 to about 50 long chain Y-branches per 10,000 carbon atoms. In one embodiment of the invention polymer, an ethylene homopolymer is produced which is characterized by relatively few short chains, generally no more than about 0 to about 10 short chains per 10,000 carbon atoms. Such long chain branched homopolymers can be properly described as having essentially no short chain branching. Such a degree of short chain branching would not be expected to affect measurable polymer properties to any appreciable extent.

In another embodiment of the invention, an ethylene homopolymer comprises molecules having long chain Y-branches and a plurality of short chain branches having nonrandom branch lengths. That is, the short chain branches will be of substantially uniform length or, alternatively, exhibit a finite number of discrete chain lengths. The latter structure would be expected to be exhibited, for example, by an ethylene, 1-butylene, 1-hexene terpolymer produced according to the invention process and containing long chain Y-branches, 2-carbon chains and 4-carbon chains.

In general, the invention ethylene polymers can be characterized by a detectable degree of long chain Y-branching and nonrandom, in terms of chain length, short chain branches ("nonrandom" including the essential absence of branches).

As used herein, the term "long chain branch" refers to a chain of sufficient length to affect the hydrodynamic volume of the polymer molecule. The term thus excludes methyl, ethyl, propyl, butyl, amyl and hexyl groups extending from the polymer backbone, and these groups fall within the classification of "short chain branches." The presence of such short chains in a polymer as well as long chain branches of seven or more carbon atoms can be determined by C-13 NMR techniques, as described below.

Branches of seven or more carbon atoms extend over branch lengths which are of medium length as well as truly long chain length, and further tests can be used to establish the presence of chains of sufficient length to change the hydrodynamic volume and significantly affect properties. One such test is the determination of the "g value" of the polymer. The g value represents long-chain branching in polyethylene. It is a calculated value obtained from the expression $$g^{\frac{1}{2}} = \frac{[\eta]_{br}}{[\eta]_{lin}}$$

wherein $\eta lin$ is calculated from GPC data assuming the polymer to be linear. The same parameters used to determine $M_w$ and $M_n$ can also be used to determine $\eta_i$ through the Mark-Houwink equation and the $W_i$ values obtained from GPC. That is $\eta_{lin} = \Sigma W_i \eta_i$ where $\eta_i = KM_i^\alpha$ and the $M_i$'s are established versus elution times by standard GPC calibration procedures. The term $W_i$ is simply the fractional weight of polymer with molecular weight i. The numerical value of K is $3.95 \times 10^{-4}$ and the numerical value of $\alpha$ is 0.729. In practice, the term $[\eta]_{obs}$ is used in place of $[\eta]_{br}$ where $[\eta]_{obs}$ is obtained using a Ubbelohde viscometer with 0.015 weight percent solutions in trichlorobenzene at 140° C. and standard procedures. Further information on such procedures is provided in J. Appl. Polym. Sci. 21, 3331–3343 (1977), hereby incorporated by reference.

The polymer of the invention can be distinguished from ethylene polymer produced in the high pressure process at least by the relative scarcity in the invention polymer of short chain branches. High pressure, low density (HPLD) polyethylene is known to have up to about 30 long chain branches per 10,000 carbon atoms. However, the molecules of HPLD polyethylene can be expected to have in addition considerably more short chain branches, for example 100–150 per 10,000 carbon atoms. The high-pressure polymer short branches will be expected to exhibit a non-uniform or random length distribution. It is, in contrast to HPLD polyethylene, characteristic of one embodiment of the invention polymer to have relatively more long chain Y-branches than short chain branches. A polymer could be prepared, for example, so as to have as few as 0 to about 10 short chain branches (having fewer than seven carbon atoms per branch) per 10,000 carbon atoms. By contrast, conventional ethylene polymers having significant long chain Y-branching can be expected to contain in addition a significant number of short chains of random length.

Samples of the novel long chain Y-branched ethylene polymer produced according to the invention process have been found to have a broad molecular weight distribution, low to medium density and viscous behavior suggestive of entanglement of long chain branches. Polymers can be produced in the process which have very low melt index (MI) values, for example less than about 0.05 g/10 min (roughly corresponding to an HLMI less than 10 g/10 min), as determined by ASTM D 1238, condition E (HLMI: condition F). Such a melt index is unusual in a polyethylene having a weight average molecular weight of less than 500,000, and particularly less than 200,000. Polymers can also be produced having an intrinsic viscosity of less than about 3.0, as determined in a Ubbelohde viscometer with a 0.015 weight percent polymer solution at 140° C.

The invention polymer is useful for coatings and the production of shaped and molded articles for which strength, durability and light weight are desirable, such as pipes, gasoline tanks and other molded automobile parts, and generally uses for which ultra high molecular weight polyethylenes are suitable.

The novel polymer of the invention is characterized by molecules having a "Y" structure. Such molecules are theorized to be the product of the attachment of a vinyl end group of one molecule or product of molecular scission to the backbone of another polymer molecule. This structure is thus distinguishable from the "H" structure of a crosslinked polymer. The invention polymer can also be characterized as a "long chain branched" polymer. Both terms for describing the molecular structure of the polymer will be understood by those skilled in the art of polymer preparation and characterization. Additional discussion of polymer molecular structure and methods of determining structure is provided in "Characterization of Long-Chain Branching in Polyethylenes Using High-Field Carbon-13

NMR," by J. C. Randall in ACS Symposium Series No. 142 (1980), the disclosure of which is hereby incorporated by reference.

The invention ethylene polymer can also be discussed with respect to the distinctive short chain branching exhibited, i.e., a nonrandom length distribution. This nonrandom length distribution can include (a) essentially no short chain branches, (b) short chain branches of uniform length, or (c) short chain branches of a plurality of discrete lengths. It is believed that the invention polymers prepared as described in the Examples are unique in exhibiting this combination of a significant degree of long chain Y-branching and short chains of nonrandom lengths.

The determination of the number of long chain branches in an ethylene polymer can be accomplished by, for example, C-13 NMR methods as described by Randall.

In these methods, quantitative characterization of polyethylenes utilizing carbon-13 NMR following irradiation and/or heat treatment is based on the appearance of new resonances associated with the formation of either short or long chain branches or the change in old resonances associated with end groups, branches, internal double bonds and oxygenated species. Each structural entity gives rise to an array of resonances; the choice of a particular resonance for quantitative purposes will depend upon overlap with other arrays or the proximity to very strong resonances which create a baseline effect or an unwanted intensity contribution. The carbons used for identification and quantitative measurements along with respective carbon-13 NMR chemical shifts in ppm from an internal TMS (tetramethylsilane) standard are listed below. Only the resonances in the 0–50 ppm region are given.

Chemical Shifts of Structural Entities Found In Polyethylene

Saturated End Groups

Vinyl End Groups

Cis Double Bonds

Trans Double Bonds

Hydroperoxide Groups

Carbonyl Groups

Ethyl Branches

Butyl Branches

Long-Chain Branches

Recurring Methylene

Chemical Shifts of the "H" Type of Crosslink in Polyethylene

R. L. Bennett, A. Keller and J. Stejny, J. Polym. Sci., Polym. Phys. Ed., 14, 3027(1976).

Figure 1:
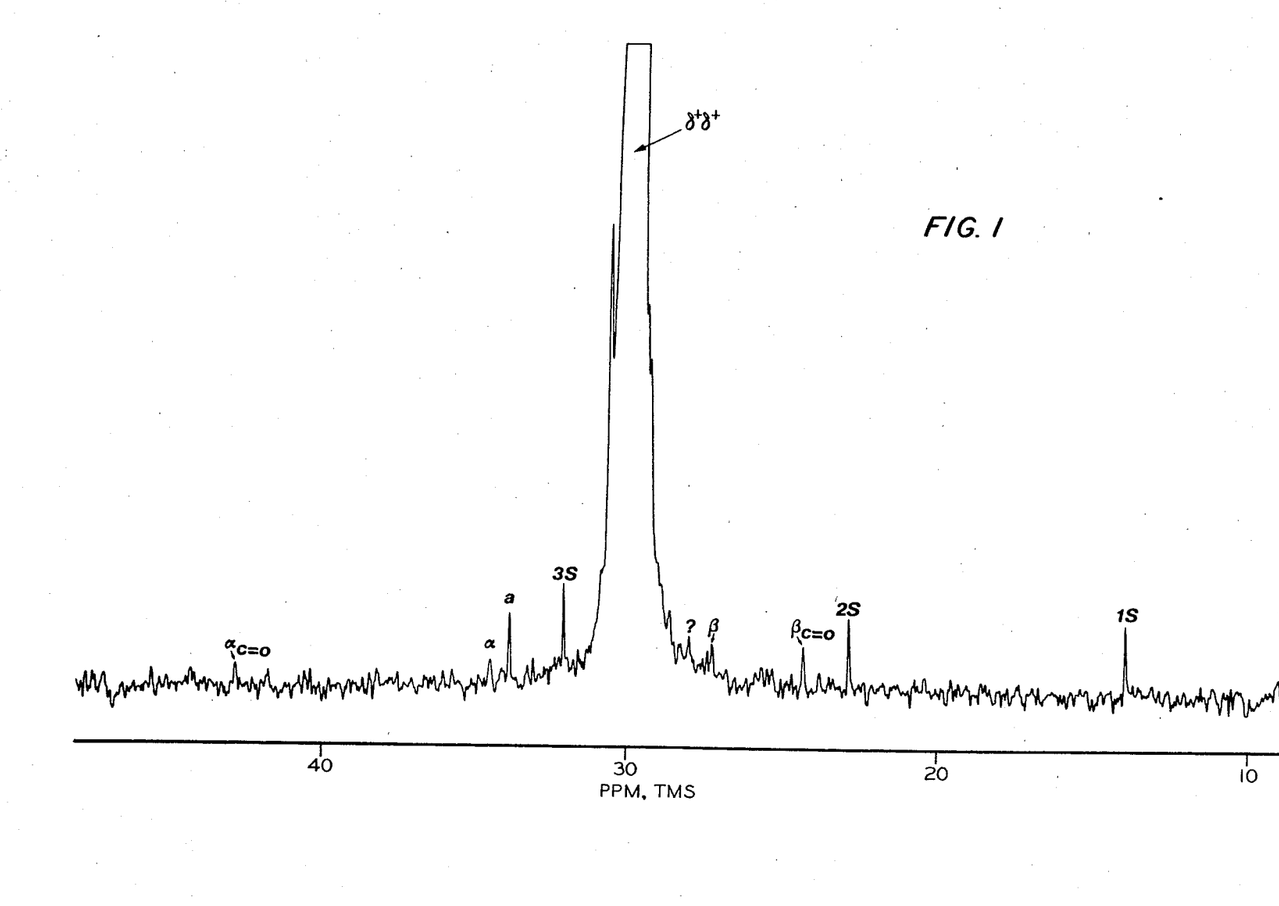
FIG. 1 is a 50.3 MHz carbon-13 NMR spectrum of a high density polyethylene produced in a low pressure polymerization process.
Figure 2:
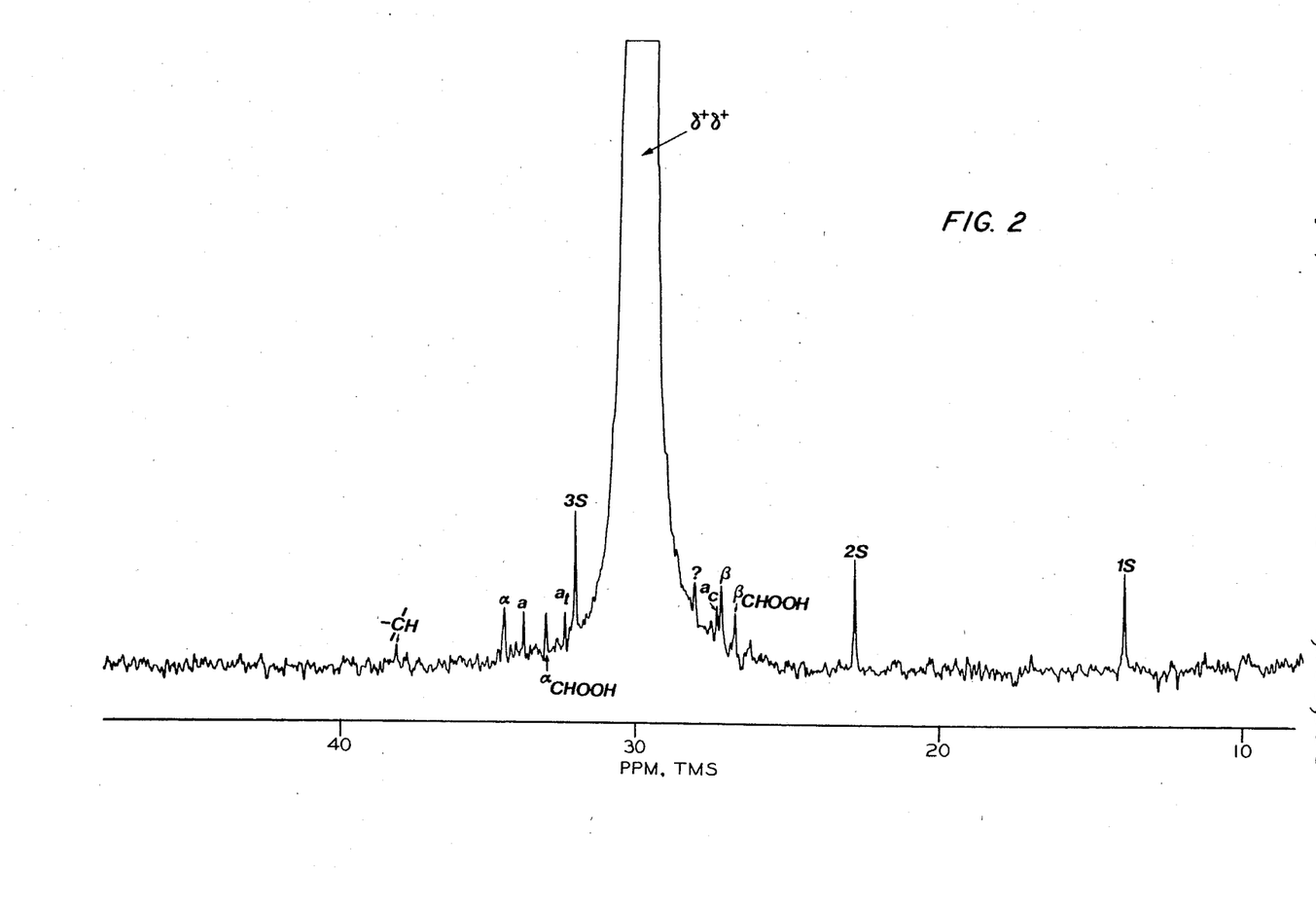
FIG. 2 is a 50.3 MHz carbon-13 NMR spectrum of the polymer of FIG. 1 exposed to 2.0 MRad irradiation in vacuo at 300° K.
Figure 3:
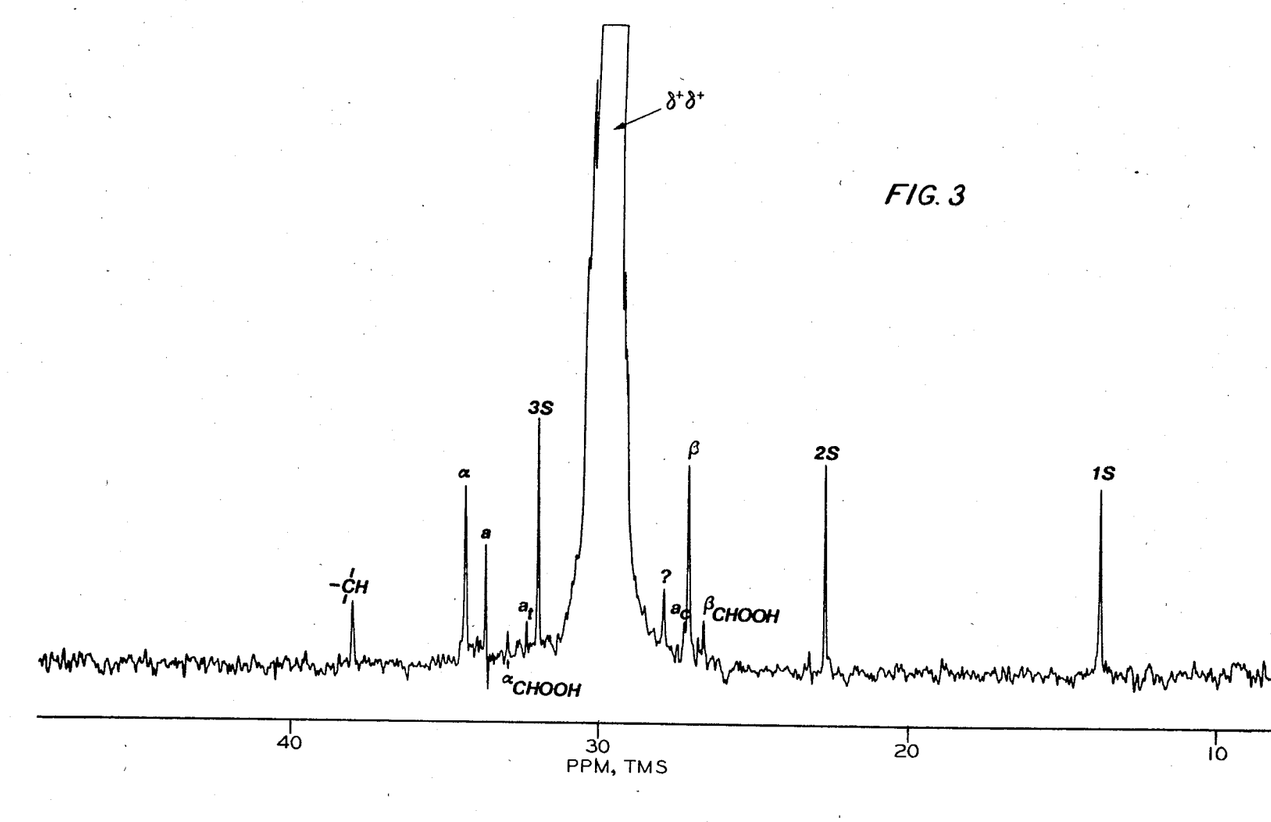
FIG. 3 is a 50.3 MHz carbon-13 NMR spectrum of the polymer of FIG. 1 exposed to 1 MRad irradiation in vacuo at 550° K. following heat treatment at 550° K. in vacuo for 24 hours.
Figure 4:
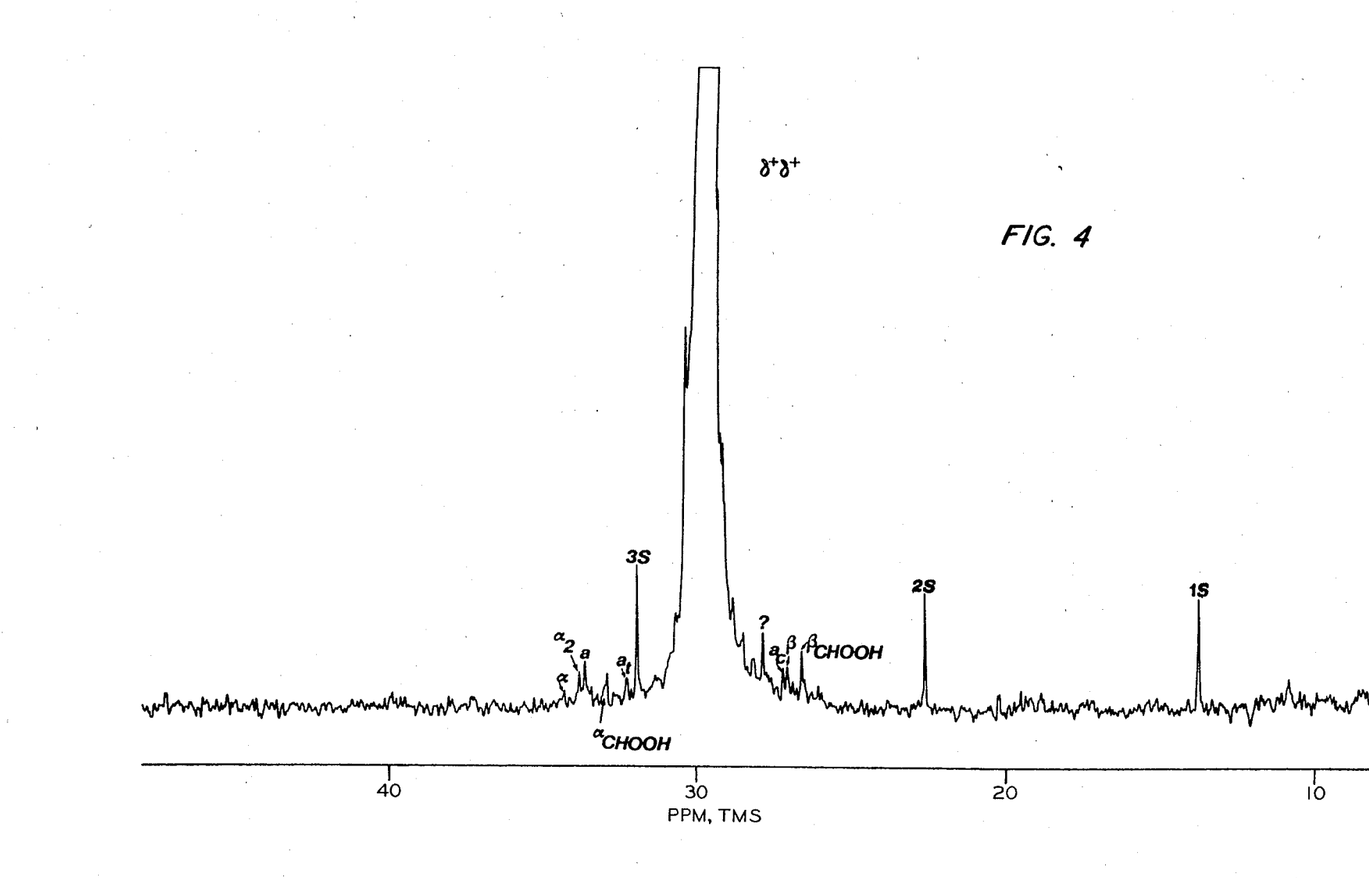
FIG. 4 is a 50.3 MHz carbon-13 NMR spectrum of a high density polyethylene produced in a low pressure polymerization process.
Figure 5:
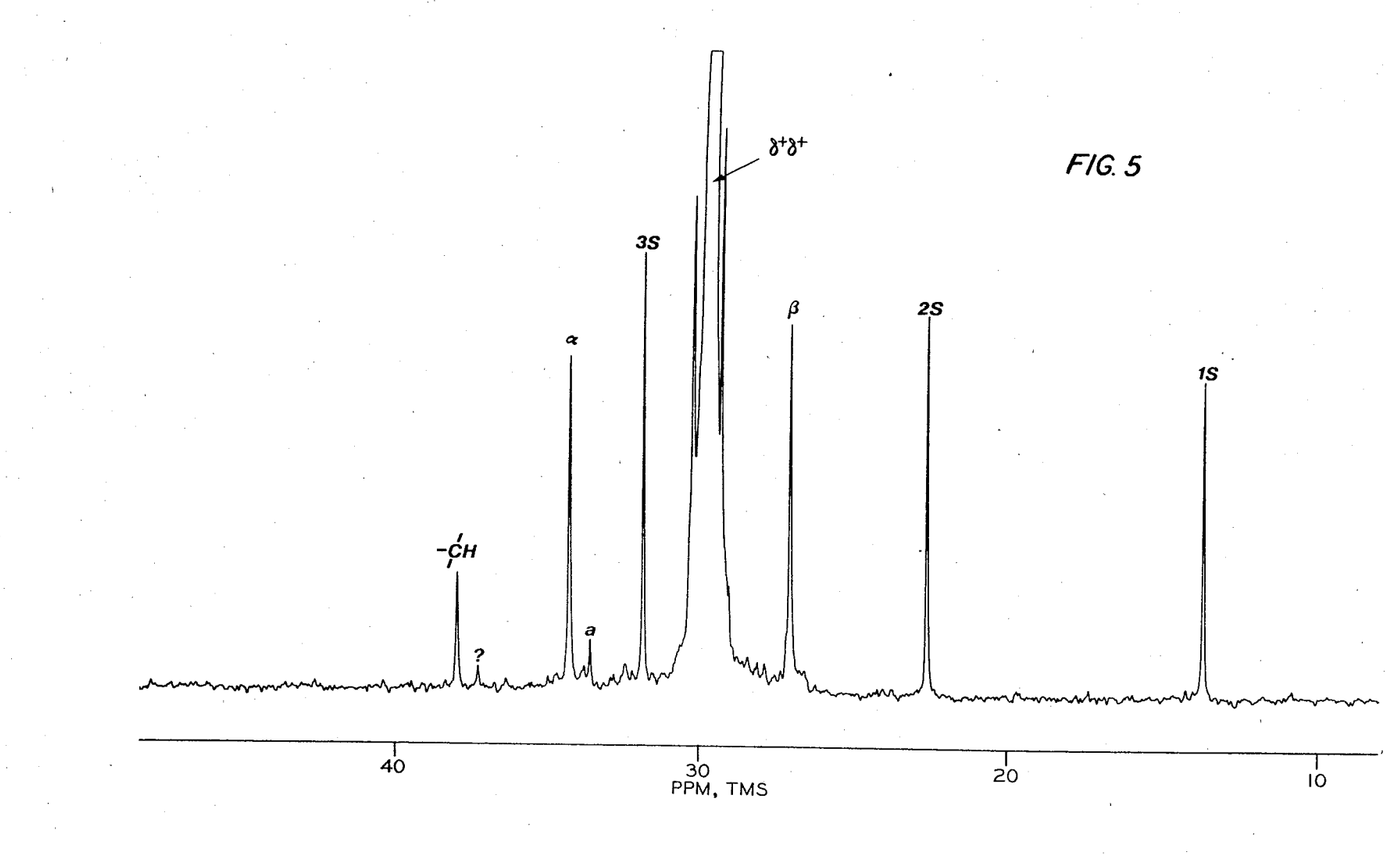
FIG. 5 is a 50.3 MHz carbon-13 NMR spectrum of the polymer of FIG. 4 after irradiation to 3.0 MRad following heat treatment in vacuo at 500° K. for 24 hours.

The concentration in structural units per 10,000 carbon atoms is determined by dividing the representative intensity of a resonance for one carbon atom from a particular structural unit array by the total carbon intensity, TCI, of a given spectrum and then multiplied by 10,000. Generally, the TCI term will be dominated by the $\delta^+ \delta^+$ intensity, which is usually set at 30,000. (Note that $I_x$ is the peak height observed at "x" ppm.) Structural unit definitions are provided below for NBS 1475 ethylene polymer (See FIGS. 1-5).

$$TCI = \delta^+\delta^+ + 9B_2 + 10LCB + 3(s+a) + 4(a_c + a_t) + 5(C=O) + 5(CH-OOH)$$

$B_2$ = a single carbon resonance intensity associated with the array of ethyl group resonances; the typical choice is $(\frac{1}{2})I_{34.06}$. When appropriate, an average of several resonances may be used.

LCB = a single carbon resonance intensity associated with the array of resonances from long chain branching. $(\frac{1}{2})I_{34.55}$ is normally used.

s = a single carbon resonance intensity associated with the saturated end group resonances. The usual choice is 2s at 22.85 ppm.

a = a single carbon resonance intensity associated with the array of resonances from terminal vinyl groups. Only one resonance at 33.89 ppm is found in the 0–50 ppm range, which is the region normally used for quantitative measurements.

$a_c, a_t$ = the allylic carbon resonance intensity for cis (27.45 ppm) and trans (32.52 ppm) internal double bonds. The one carbon intensity will be $(\frac{1}{2})I_{27.45}$ and $(\frac{1}{2})I_{32.52}$, respectively, for $a_c$ and $a_t$.

C=O = the single carbon intensity for the array of resonances associated with carbonyl groups. $(\frac{1}{2})I_{42.83}$ is normally used.

CH—OOH = the single carbon intensity for the array of resonances associated with hydroperoxide groups. The usual choice is $(\frac{1}{2})I_{33.14}$.

$\delta^+\delta^+$ = the peak height of the 29.98 ppm resonance for —$(CH_2)_n$—, the major, recurring methylene resonance. All other listed peak heights are relative to $\delta^+\delta^+$, which is determined by defining the vertical scale during spectral printout. A typical value for polyethylene measurement is 30,000.

The particular definition for TCI will vary from one polyethylene to another depending upon the structural units present. Often, an $\alpha$-olefin is added deliberately to produce a short chain branch of a specific length. Sometimes a particular catalyst system will produce unplanned branches or only certain types of end groups which have to be considered when defining the total carbon intensity. The number and types of oxygenated species as well as cis and trans double bonds will also vary as will the intrinsic amount of long chain branching. the amount of these "unplanned" structual units (and end units) is generally very small and contribute, at most and collectively, about 1% to the value of TCI in high density polyethylenes. What is by far the most important consideration is an accurate assessment of the relative amounts of the various structural species present in polyethylenes. For this reason, it is best to select well-isolated resonances with similar line-widths for quantitative measurements. In the previous definitions, only $\alpha$ carbons and allylic carbons were recommended for peak height measurements. It was also observed that "2s" had the best line width for comparison purposes. Until accurate relative intensity measurements (integrated peak intensities) can be made under these dynamic range conditions, peak heights afford the most reliable and reproducible approach.

Carbon-13 NMR quantitative determinations can be made as follows:

Long Chain Branches/10,000 carbons = (LCB/TCI) × $10^4$

Saturated End Groups/10,000 carbons = (s/TCI) × $10^4$

Vinyl End Groups/10,000 carbons = (a/TCI) × $10^4$

Cis Double Bonds/10,000 carbons = ($a_c$/TCI) × $10^4$

Trans Double Bonds/10,000 carbons = ($a_t$/TCI) × $10^4$

Carbonyl Groups/10,000 carbons = (C=O/TCI) × $10^4$

Hydroperoxide Groups/10,000 carbons = (CH—OOH/TCI) × $10^4$

Ethyl Branches/10,000 carbons = ($B_x$/TCI) × $10^4$

In general, C-13 NMR spectra of the long chain Y-branched ethylene polymers which have been produced by the invention heat/irradiation process are characterized by the presence of an array of $\alpha$(34.55), $\beta$(27.30), Y(30.47) and methine (38.19) resonances which are in proportion to the amount of long-chain branching present.

EXAMPLE I

A series of runs was made as described below employing a linear ethylene homopolymer designated as National Bureau of Standards Material 1475. The polymer, as received, has a density of 0.9874 g/cm³ as determined in accordance with ASTM D1505, a melt index (MI) of 2.07 g/10 min. as determined in accordance with ASTM D1238 (Condition E) and an average of about 5.6 terminal vinyl groups per 10,000 carbon atoms as determined by means of high-field carbon-13 nuclear magnetic resonance (NMR) measurements (later described). The polymer is available from E. I. duPont de Nemours and Company, Wilmington, Del., and is stabilized by the producer with 111 ppm of the antioxidant tetrakis[methylene-3(3',5'-di-t-butyl-4'-hydroxyphenyl)-propionate]methane (Irganox ®1010, Ciba-Geigy). A sample of the polymer weighing about 20 to 25 g was employed in each run. Generally, the sample was degassed for 24 hours at the same temperature to be employed for any subsequent irradiation, e.g. 24 hours at either 300° K. or about 500°–550° K. The irradiation was conducted in vacuo, unless specified otherwise, employing a 25,000 curie cobalt-60 source. With this source, a 1 MRad dosage level required one hour of irradiation.

The structural features associated with each polymer sample, before and after the specified treatment were determined by means of carbon-13 NMR measurements employing a Varian XL-200 NMR spectrometer at 50.3 MHz. The samples to be measured were dissolved in 1,2,4-trichlorobenzene at 15 weight percent and maintained under a nitrogen atmosphere at 398° K. during the measurements. The nomenclature used in the following tables is that established by J. C. Randall, "Polymer Characterization by ESR and NMR," edited by A. E. Underwood and F. A. Bovey, ACS Symposium Series No. 142, American Chemical Society, Washington, D.C., 1980, 93–118.

The number average molecular weight ($M_n$) and weight average molecular weight ($M_w$) determinations were made with either a Waters 150C gel permeation chromatograph (GPC) using 4 porous silica columns: two SE 4000, one Se 500 and one PSM 605, available from DuPont or/and low angle laser light scattering (LALLS) measurements with a Chromatix KMX-6 unit coupled to a DuPont Model 870 size exclusion chromatograph (SEC) using the same column set as that employed in the Waters unit.

The results are summarized in Table 1.

TABLE 1

Treatment Afforded NBS 1475 Polyethylene

| Structural per $10^4$ Carbon Atoms | Run No. 1 Before Irradiation Control | Run No. 2 Heated In Vacuo 24 Hrs. @ 500° K. 3 MRad Invention | Run No. 3 2.0 MRad | Run No. 4 Irradiation, 298° K.*, In Vacuum 4.0 MRad | Run No. 5 8.0** MRad Comparison |
|---|---|---|---|---|---|
| —CH$_2$CH$_2$CH$_3$ | 13.3 | 126.7 | 14.6 | 16.6 | 13.3 |
| —CH$_2$CH=CH$_2$ | 5.6 | 16.7 | 3.4 | 3.6 | — |
| Long Chain "Y" Branches | 0.8 | 34.2 | 0.8 | 1.9 | — |
| Cis C=C (H, H) | 2.5 | 9.1 | 2.7 | 2.8 | — |
| Trans C=C (H, H) | 1.9 | 4.4 | 2.0 | 2.7 | 5.8 |
| Ethyl Branches | 2.3 | 3.9 | 2.1 | 2.4 | — |
| \CH—OOH / | 2.2 | 2.9 | 2.3 | 2.4 | 4.9 |
| \C=O / | — | 1.5 | 1.9 | 1.7 | 3.1 |
| $M_w \times 10^{-3}$ | 52.8 | 35.8 | 116 | 128 | |
| $M_n \times 1^{-3}$ | 18.1 | 5.5 | 21.8 | 22.3 | |
| $M_w/M_n$ | 2.9 | 6.5 | 5.3 | 5.7 | |

Notes:
*Room temperature
**Sample partially Gelled; observed soluble component only The structural entities of the polyethylene before irradiation or/and heating, which present a baseline for comparison purposes, are detailed in run 1. The untreated polymer, for example, contained per 10,000 carbon atoms, about 13 saturated terminal groups, about 5.5 terminal vinyl groups, about 0.8 long chain "Y" branches, about 2 ethyl branches, a $M_n$ of about 18,000 and a $M_w$ of about 53,000 to provide a molecular weight distribution, of 2.9 $M_w/M_n$. Runs 3, 4, 5 indicate that irradiating solid polyethylene to a dosage from 2 to less than about 8 MRad (just short of the gel point) leads only to a small increase in the number of long chain branches. This amount of branching, however, is associated with a pronounced effect on the weight average molecular weight, which changed from about 53,000 to about 116,000 in run 3 to about 128,000 in run 4. At the same time a moderate increase in number average molecular weight is noted, the effects of the increased weight average and number average molecular weights giving rise to a broadened molecular weight distribution relative to the control polymer. An increase in saturated terminal groups and a decrease in terminal vinyl groups along with the increase in the molecular weight is consistent with a mechanism suggesting that branching or end linking is the dominant reaction in the solid state irradiation of the polymer under the conditions employed. Chain scission appears to play only a minor role under these moderate temperature conditions.

However, when the polymer is thermally degraded in vacuo for 24 hours at about 550° K. followed by irradiation of the molten product at that temperature with a 3 MRad dosage as in invention run 2, it is apparent that striking changes have occurred relative to control run 1. The number of saturated terminal groups has increased about an order of magnitude, the number of terminal vinyl groups has nearly tripled, the number of ethyl branches shows only a nominal increase, the number of cis and trans internal double bonds also showed only nominal increases especially when compared to the increase in long chain branching, which changed dramatically from about 1 to about 34 per 10,000 carbon atoms. Simultaneously the polymer produced is substantially lower in weight average and number average molecular weights while the molecular weight distribution has increased about 2.2 times. These results are consistent with a process which initially thermally degraded the polymer involving chain scission, the fragments being reconstituted by irradiation to produce a polymer having many long chain "Y" branches. The reconstitution reaction may involve "end-linking" or grafting of the fragments. On the other hand, the effect on short chain branches is relatively minor.

The polymer sample which was heated in vacuo for 24 hours prior to 3 MRad irradiation at 500° K. (227° C.) had an intrinsic viscosity of 0.54, a g value of 0.73, and a density of 0.9471 (0.9784 prior to treatment).

EXAMPLE 2

A series of runs was made somewhat similar to those described in the first example employing as the ethylene polymer an unstabilized ethylene homopolymer fluff prepared with a supported chromium oxide catalyst. The polyethylene is commercially available as Marlex ®6003 from Phillips Petroleum Company, Bartlesville, Okla. It is a linear polyethylene having a nominal density of 0.963 g/cm$^3$, a nominal melt index of 0.35 g/10 min. and an average of about 9.2 terminal vinyl groups per 10,000 carbon atoms. The polymer is commercially stabilized with 300 ppm of 2,6-di-t-butyl-4-methylphenol, 400 ppm of dilaurylthiodipropionate and 100 ppm of calcium stearate. Each polymer sample, about 20–25 g, was degassed in vacuo and irradiated in vacuo or in air. The structural features and molecular weights of the initial polymer, the products made, and conditions employed are detailed in Table 2.

7,8) thermally degraded polymer subsequently irradiated in the melt state (invention runs 9, 10), polymer irradiated in a vacuum at room temperature (comparison run 11) and polymer irradiated at room temperature in air (control run 12).

In comparing the structural entities and molecular weights of the untreated polymer in control run 6 with the same properties obtained with the polymer irradiated in air with 4 MRad at room temperature in control run 12 it is evident that the irradiated polymer has undergone extensive degradation, e.g. chain scission, since the weight average molecular weight has decreased about 58 percent and the number average molecular weight has declined about 25 percent. The number of terminal vinyl groups and long chain branches have also declined while the internal cis and trans groups have increased. As expected, the number of hydroperoxide and carbonyl groups have also increased. This behavior is consistent with a degradation process conducted in air.

In comparing the properties of thermally degraded polymer produced in a vacuum in comparison runs 7, 8 with the untreaded polymer of control run 6, it is evident that the thermal degradation process alone is capable of substantially increasing the number of terminal

TABLE 2

Treatment Afforded Polyethylene Produced With Cr-Based Catalyst

| Structural Entities per 10$^4$ Carbon Atoms | 6 Before Irradiation Control | 7 Heated In vacuo for 24 hours @ 500° K. Comparison | 8 Heated In vacuo for 24 hours @ 550° K. Comparison | 9 Heated In Vacuo for 24 hours @ 500° K. 1 MRad while cooling Invention | 10 Heated In Vacuo for 24 hours @ 550° K. 1 MRad @ 550° K. Invention | 11 2 MRad In vacuo @ 298° K. Comparison | 12 4 MRad In Air @ 298° K. Control |
|---|---|---|---|---|---|---|---|
| —CH$_2$—CH$_2$—CH$_3$ | 9.5 | 31.8 | 23.0 | 33.0 | 22.6 | 12.8 | 13.4 |
| —CH$_2$—CH=CH | 9.2 | 27.1 | 19.2 | 25.5 | 13.4 | 6.6 | 6.7 |
| Long Chain "Y" Branches | 1.5 | 4.4 | 4.4 | 4.2 | 7.2 | 2.6 | 1.1 |
| Cis  | 2.2 | 2.2 | 3.5 | 3.7 | 2.7 | 3.7 | 4.0 |
| Trans  | 1.6 | 2.0 | 2.6 | 2.2 | 2.6 | 3.3 | 3.8 |
| Ethyl Branches | 2.2 | 1.7 | 2.2 | 1.4 | 1.7 | 2.5 | — |
| Butyl Branches | — | 3.0 | 2.6 | 3.1 | 3.0 | — | — |
|  CH—OOH (Hydroperoxide) | 1.6 | 1.9 | 2.2 | 2.0 | 2.1 | 3.3 | 3.9 |
|  C=O | 0.7 | — | — | — | — | — | 1.7 |
| M$_w$ × 10$^{-3}$ | 140 | 154 | 166 | 164 | 192 | 164 | 58.3 |
| M$_n$ × 10$^{-3}$ | 20 | 6.7 | 13.1 | 12.1 | 14.8 | — | — |
| M$_w$/M$_n$ | 7.0 | 23.0 | 12.4 | 13.6 | 12.9 | ≧7.4 | ≧3.6 |

The results in Table 2 demonstrate the changes in the structural entities of a polyethylene produced in the presence of a supported chromium oxide catalyst due to thermal degradation alone in vacuo (comparison runs vinyl groups and long chain branches. These results suggest that some Chain scission is occurring followed by recombination of the fragmented chains into longer chains containing both Y-branches and butyl branches.

Invention runs 9, 10 illustrate the effects of superimposing irradiation of the polymers produced in vacuo in runs 7,8 respectively. In invention run 9, the thermally degraded polymer, initially at a temperature of 500° K., was irradiated for 1 hour for a dosage level of 1 MRad while the polymer cooled to about 298° K. in a relatively short time. It is felt that at least ½ of the irradiation may have been conducted at or near 298° K. The effects of conducting the irradiation at a high temperature, e.g. 550° K., on the thermally degraded polymer are shown in run 10. In relating the properties of the thermally degraded polymer of run 7 with those of invention runs 9, 10 it is apparent that the irradiation is speeding the recombination of the polymer fragments to give a higher molecular weight polymer based on weight average molecular weight containing more long chain branches. The number of long chain branches is substantially increased in invention run 10. Concommittently, the number of terminal vinyl groups is declining, consistent with a process in which end-linking of polymer fragments containing terminal vinyl groups is being expedited by irradiation.

In viewing the results of the examples taken together it is evident that the key to producing long chain branches in a polymer is related to the number of terminal vinyl groups per 10,000 carbons associated with the initial polymer. Polymers inherently containing sufficient terminal vinyl groups to be improved by irradiation short of the gel point in a vacuum are those produced by contact with a supported chromium oxide catalyst such as those of U.S. Pat. No. 2,825,721 (Hogan & Banks). It is desirable, however, that such polymers first undergo a thermal degradation step in an inert atmosphere such as argon, nitrogen, etc., or in a vacuum to increase the number of terminal vinyl groups to enhance the effects of the irradiation process.

Polymers produced in other processes such as those employing titanium- and/or vanadium-containing coordination catalysts which inherently give fewer terminal vinyl groups can also be used providing that such polymers are first thermally degraded as above to provide products containing sufficient numbers of terminal vinyl groups to be improved by the irradiation process.

Although not absolutely necessary, it is preferred that the polymers be irradiated in the melt state to expedite the formation of the long chain branched polymer.

Although the examples demonstrate the benefits achieved with ethylene homopolymers it is contemplated that random ethylene/1-olefin copolymers, terpolymers, etc. containing up to about 20 mole total comonomer(s) can also be employed in the invention process. Such comonomers are aliphatic mono-1-olefins containing from 3 to about 20 carbon atoms per molecule.

It is also contemplated that relatively normally solid low molecular weight ethylene polymers produce insitu with a supported chromium oxide catalyst or with normally solid predegraded ethylene polymers can be mixed with normally solid, high molecular weight polymers containing sufficient numbers of terminal vinyl groups as disclosed previously to provide mixtures which can then be irradiated according to the invention. By normally solid low molecular polymers in this context is meant those having weight average molecular weights ranging from about 1,000 to about 2,000.

In addition, those mono-1-olefins containing sufficient carbon atoms to be relative non-volatile during the irradiation process conducted with the molten polymers can also be present to provide some long chain branching. Exemplary of such 1-olefins are those linear and branched chain compounds containing from about 14 to 30 carbon atoms or more, for example, 1-tetradecene, 1-eicosene, 1-tricontene, and the like and mixtures thereof.

It is believed that the invention polymers contain little or no crosslinking resulting from the irradiation treatment based on a soxhlet extraction using boiling xylene which yielded no insolubles. The polymer sample which was heated in vacuo at 550° K. (277° C.) for 24 hours prior to irradiation had an intrinsic viscosity of 1.77, a g value of 0.67, an HLMI of 0.14 and a density of 0.9524 (MI 0.31 and density 0.9615 prior to irradiation).

We claim:
1. A method comprising:
   irradiating a polymer selected from ethylene homopolymers and copolymers in the absence of oxygen under non-gelling conditions at a temperature above the crystalline melting temperature of the polymer and greater than about 130° C., and
   cooling the resulting irradiated, non-gelled polymer to a temperature below its crystalline melting point.
2. The method of claim 1 in which the polymer is ethylene homopolymer.
3. The method of claim 1 in which the polymer is a copolymer of ethylene and at least one other α-olefin monomer.
4. The method of claim 1 in which the non-gelling conditions include an inert atmosphere.
5. The method of claim 1 in which the irradiation is conducted in vacuo.
6. The method of claim 1 in which the irradiation is carried out at a temperature in the range of about 130° C. to about 300° C.
7. The method of claim 1 in which the irradiation is provided in the form of gamma rays in a dose of about 0.1 MRad to about 4 MRad.
8. The method of claim 1 which comprises cooling the irradiated polymer to ambient temperature.
9. The method of claim 1 in which the irradiated polymer is cooled by quenching in a relatively cool liquid.
10. The method of claim 1 in which the polymer has an average of about 0.1 to about 0.5 vinyl end groups per molecule.
11. The method of claim 1 in which the polymer is the product of a low-pressure polymerization reaction catalyzed with a supported chromium catalyst.
12. The method of claim 1 in which the irradiated polymer has a g value of less than about 0.9.
13. The method of claim 1 in which the irradiation is carried out at a temperature of about 200° C. to about 280° C.
14. A method comprising the steps of
   heating a polymer selected from ethylene homopolymers and copolymers in the absence of oxygen under non-gelling conditions at a temperature above the melting point of the polymer for a time of from about 0.5 to about 36 hours;
   irradiating the thus-treated polymer under non-gelling conditions; and
   cooling the thus-irradiated polymer to a temperature below its crystalline melting point.

15. The method of claim 14 in which the polymer is an ethylene homopolymer.

16. The method of claim 14 in which the polymer is a copolymer of ethylene and at least one other α-olefin having from 3 to about 20 carbon atoms.

17. The method of claim 14 carried out in vacuo.

18. The method of claim 17 carried out at a temperature of about 130° C. to about 300° C.

19. The method of claim 18 in which the polymer is maintained in a melt state for a time of from about 16 hours to about 36 hours prior to irradiation.

20. The method of claim 19 in which the irradiation is maintained for a time of about 30 seconds to about 4 hours.

21. The method of claim 19 in which the radiation treatment provides a dose of gamma rays from about 0.1 to about 4 MRad.

22. The method of claim 18 in which the heating is maintained for a time sufficient to produce polymer having terminal vinyl unsaturation at a level of at least about 10 per 10,000 carbon atoms prior to irradiation.

23. The method of claim 18 in which the dose of radiation is sufficient to increase long chain Y-branching in the polymer.

24. The method of claim 23 which further comprises the step of recovering a polymer having at least about 2 long chain Y-branches per 10,000 carbon atoms.

25. The method of claim 24 in which the recovered polymer has a g value of less than about 0.9.

26. The method of claim 23 in which the treated polymer is a product of low pressure polymerization employing a supported chromium catalyst.

27. The method of claim 14 in which the heating step is performed under conditions of temperature and time effective for increasing the vinyl end group unsaturation in the polymer.

28. The method of claim 14 in which the irradiation step is performed under conditions effective for formation of long chain Y-branched molecules.

29. The method of claim 17 carried out at a temperature of about 200° C. to about 280° C.

30. A product of the process of claim 1.

31. A product of the process of claim 11.

32. A product of the process of claim 12.

33. A product of the process of claim 14.

34. A product of the process of claim 23.

35. A product of the process of claim 25.

36. An article of manufacture produced from the product of the process of claim 1.

37. An article of manufacture produced from the product of the process of claim 14.

38. A product of the process of claim 1 having about 7 to about 50 long chain Y-branches and 0 to about 10 short chain branches per 10,000 carbon atoms.

39. A product of the process of claim 14 having about 7 to about 50 long chain Y-branches and 0 to about 10 short chain branches per 10,000 carbon atoms.

40. The product of claim 38 having a g value of less than about 0.9.

41. The product of claim 39 having a g value of less than about 0.9.

42. An article of manufacture produced from the product of claim 38.

43. An article of manufacture produced from the product of claim 39.

44. The method of claim 1 in which the polymer comprises molecules having at least one vinyl end groups per molecule.

45. The product of the process of claim 1 which is soluble in boiling xylene.

* * * * *